United States Patent [19]

Cordiano

[11] Patent Number: 4,615,408
[45] Date of Patent: Oct. 7, 1986

[54] RACK POWER-STEERING SYSTEMS
[75] Inventor: Ettore Cordiano, Turin, Italy
[73] Assignee: CORINT S.r.l., Italy
[21] Appl. No.: 688,130
[22] Filed: Jan. 2, 1985
[30] Foreign Application Priority Data Apr. 11, 1984 [IT] Italy ............................ 67362 A/84

[51] Int. Cl.$^4$ ............................................. B62D 3/12
[52] U.S. Cl. ...................................... 180/148; 74/498;
91/467; 92/136
[58] Field of Search .............. 180/148, 147, 132;
74/388 PS, 498; 91/368, 467; 92/136;
137/DIG. 4

[56] References Cited
U.S. PATENT DOCUMENTS 4,299,302 11/1981 Nishikawa ........................... 74/498
4,351,228 9/1982 Schultz ................................ 180/148

FOREIGN PATENT DOCUMENTS 0078879 5/1983 European Pat. Off. ............ 180/148

Primary Examiner—John J. Love
Assistant Examiner—Mark C. Dukes
Attorney, Agent, or Firm—Sughrue, Mion, Zinn, Macpeak, and Seas

[57] ABSTRACT

In a rack power-steering system, the axial movements of a helical pinion meshing with the rack, resulting from torque applied to the pinion, cause corresponding movements of the movable member of a control valve of the system. This is achieved through a transmission including a piston movable axially with the pinion and defining a variable-volume compartment filled with a substantially-incompressible, deformable material, such as a fluid (oil or grease) or rubber, this material being intended to transmit a control pressure to the movable member of the control valve through a rod which may be formed integrally with the movable member or as a separate member. The variable-volume compartment is located at one end of a cylindrical chamber of the box of the system within which the piston is slidable and the latter is located in a position axially intermediate the variable-volume compartment and an end of the shaft carrying the helical pinion. When the variable-volume compartment is filled with fluid, sealing devices are interposed between the piston and the wall of the cylindrical chamber and between the rod and its slide seat so as to isolate the chamber from the exterior. The sealing devices may, for example, consist of two sealing rings mounted on the external surfaces of the piston and of the rod respectively, or, for example, of two deformable diaphragms fixed around their peripheries to the wall of the cylindrical chamber with their central parts pressed against the piston and against the rod respectively by the fluid in the variable-volume compartment.

10 Claims, 5 Drawing Figures

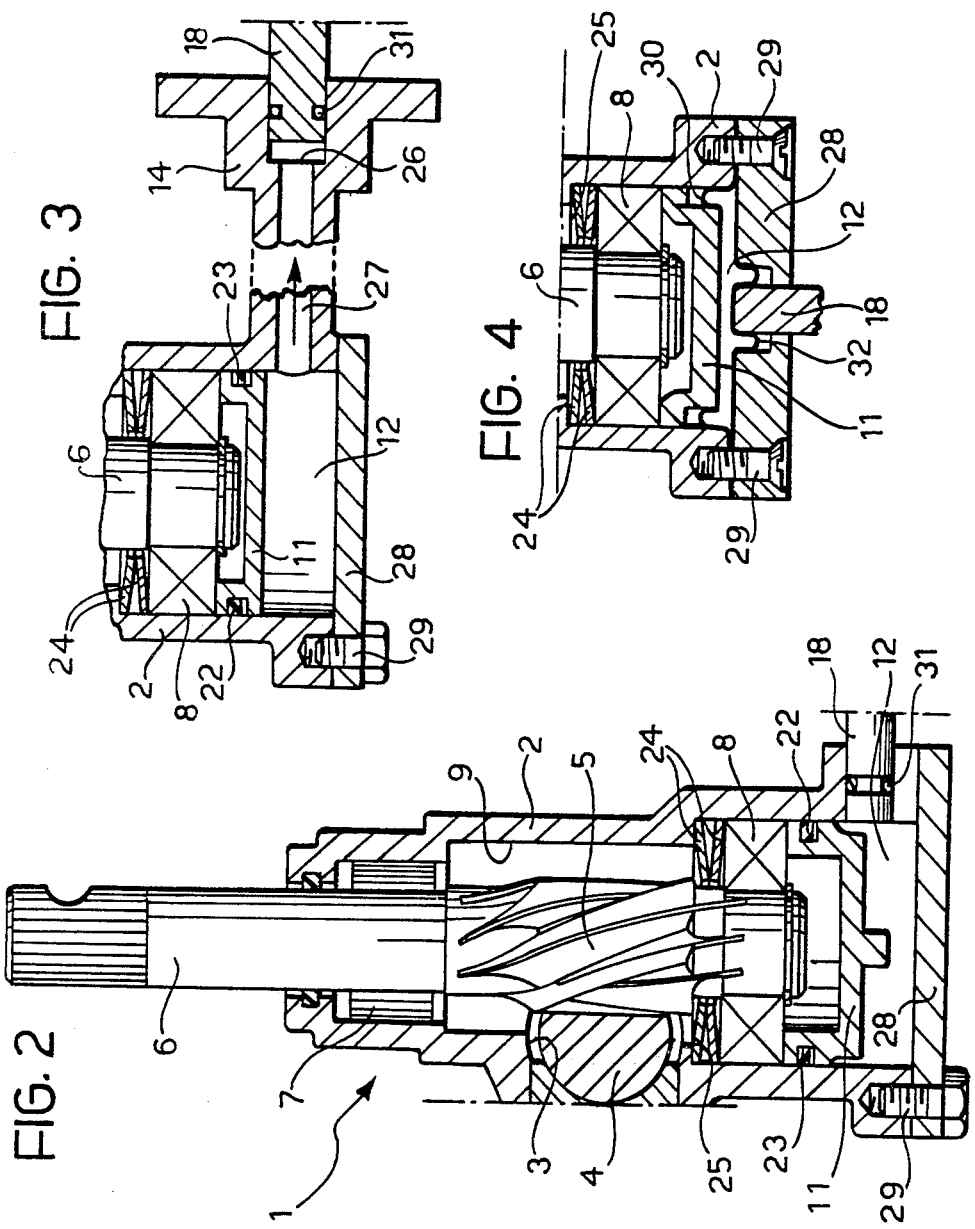

RACK POWER-STEERING SYSTEMS

The present invention relates to rack power-steering systems of the type comprising
a box,
a helical pinion meshing with a rack,
a shaft carrying the pinion,
a bearing which rotatably supports the shaft within a cylindrical chamber in the box, the bearing being slidable within the cylindrical chamber so as to permit axial movements of the pinion,
a control valve having a movable member which is slidable in an auxiliary chamber in the box,
means for converting an axial movement of the pinion into a movement of the movable member of the control valve, these means comprising
a piston movable axially with the said bearing within the cylindrical chamber in the valve
a variable-volume compartment defined within the cylindrical chamber by the piston, this compartment being filled with a susbtantially-incompressible, deformable material,
a rod operatively connected to the movable member of the control valve and having one end face located so as to detect the pressure existing in the variable-volume compartment,
resilient means biasing the piston and the rod towards the variable-volume compartment.

Systems of the type specified in the foregoing are illustrated in Italian Patent Application No. 67269-A/83, filed on the 9th March 1983, in the corresponding European Patent Application No. 84830054.7, in Italian Patent Application No. 68449-A/81, filed on the 9th November 1981, and in the corresponding European Patent Application No. 82104765.7 (publication No. 0 078 879).

The object of the present invention is to improve the systems previously proposed by making them more functional and giving them a simpler and more economical construction.

The main characteristic of the system according to the invention lies in the fact that the variable-volume compartment is disposed at one end of the cylindrical chamber and the piston is located in a position axially intermediate the variable-volume compartment and one end of the shaft carrying the pinion.

By virtue of this characteristic, the structure of the system is simpler and more reliable. In particular, when the variable-volume compartment is filled with a fluid, such as oil or grease, the seal between the piston and the wall of the cylindrical chamber is achieved by simpler means than in the case proposed in Italian Patent Application No. 67269-A/83, in which the variable-volume compartment consisted of an annular chamber surrounding the shaft carrying the pinion. In a different embodiment, the variable-volume compartment is filled with a rubber element, and the rod is disposed with its axis parallel to, and susbtantially coincident with, that of the pinion. The rubber element is of such a shape as to fill the variable-volume compartment completely, adhering to the side wall and an end wall of the cylindrical chamber and to the surfaces of the piston and of the rod which face the variable-volume compartment. In comparison with the known solution illustrated in Italian Patent Application No. 68449-A/81, in which the variable-volume compartment consists of an annular compartment surrounding the shaft carrying the pinion, and in which this compartment is filled with an annular rubber element which cooperates with a zone of the outer peripheral surface of the rod, this has the advantage that the rubber element is able to transmit the movements of the piston to the rod more easily.

With reference to embodiments of the invention in which the variable-volume compartment is filled with fluid, the piston is provided with associated sealing means which may for example consist of a sealing ring mounted on the external surface of the piston and in contact with the wall of the cylindrical chamber, or, alternatively, of a deformable diaphragm fixed around its periphery to the wall of the cylindrical chamber with its central part pressed against the piston by the fluid in the variable-volume compartment.

The aforesaid rod for controlling the movable member of the control valve may be formed integrally with, or separately from, the movable member of the control valve. In addition, the rod may be arranged in such a way as to have an end surface facing the variable-volume compartment, or, if the variable-volume compartment is filled with fluid, it may be located at a distance from the variable-volume compartment; a duct is then provided for communication between the compartment and the chamber in which the rod is slidable. Furthermore, the rod may be slidable in a direction perpendicular to the axis of the pinion, or in a direction coincident with the axis of the pinion, or, again, in any direction different from those mentioned above.

Further characteristics and advantages of the present invention will become apparent from the description which follows, with reference to the appended drawings, provided purely by way of non-limiting example, in which:

FIG. 2 is a sectional view of a first embodiment of the system according to the invention;

FIG. 3 is a partially-sectioned view of a second embodiment of the system according to the present invention;

FIG. 4 is a partially-sectioned view of a third embodiment of the system according to the invention.

FIG. 1 illustrates a rack power-steering system of the type proposed in the prior Italian Patent Application No. 67269-A/83, filed on the 9th March 1983, and in the corresponding European Patent Application No. 84830054.7, filed on the 2nd March 1984.

Figure 1:
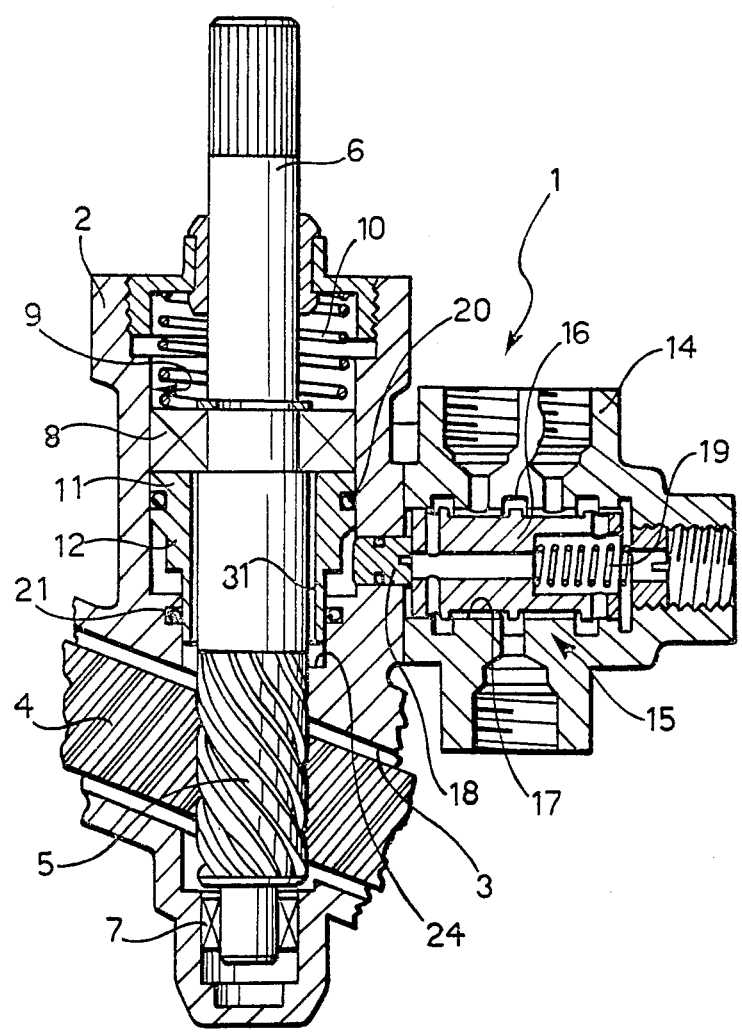
FIG. 1 is a sectional view of a rack power-steering system as previously proposed.

With reference to this Figure, reference numeral 1 generally indicates a rack power-steering system including a box 2, having a passage 3 for a rack 4. The rack 4 meshes with a helical pinion 5, forming part of a shaft 6 which is intended to be controlled by the steering wheel of the motor vehicle through a transmission system of known type (not illustrated). The shaft 6 is rotatably mounted in the box by means of bearings 7, 8 which allow the pinion 5 to move axially relative to the box. The bearing 8 is slidable in a cylindrical chamber 9 in the box 2 and is urged by a spring 10 against an annular piston 11 which is disposed around the shaft 6. The piston 11 and the wall of the cylindrical chamber 9 define an annular compartment 12 of variable volume which is filled with a substantially incompressible fluid, such as oil or grease. The box 2 includes a separate member 14 constituting the body of a control valve 15 forming part of the power-steering system. The valve 15 includes a movable member 16 which is slidable in an auxiliary chamber 17 which, in the embodiment illustrated, is disposed with its axis perpendicular to the axis of the shaft 6. Reference numeral 18 indicates a small rod slidable in the box 2 along the axis of the auxiliary chamber 17. The rod 18 is interposed between the variable-volume compartment 12 and the member 16, the latter being urged against the rod 18 by a spring 19. The springs 10, 19 maintain the fluid within the compartment 12 under pressure and bias the movable member 16 of the valve into a central, neutral position (illustrated in FIG. 1) when no torque is applied to the pinion 5. When a torque is applied to the pinion, the latter is constrained to move axially, by the thrust exerted thereon by the helical teeth of the rack. This causes a different pressure to be exerted on the fluid in the compartment 12 by the piston 11, which consequently causes the movable member 16 of the control valve to move away from its neutral central position. The variable-volume compartment 12 is isolated from the rest of the cylindrical chamber 9 by means of two sealing rings 20, 21 interposed between the piston 11 and the wall of the cylindrical chamber 9. The piston 11 has such a shape and size that, should there by a loss of fluid from the compartment 12, it would move to its end-of-stroke position against the box 2, and in this position its external surface would contact the rod 18, preventing the latter from entering the compartment under the action of the spring 19, and from causing the power steering to come into play without the driver expecting it.

In FIGS. 2 to 5, the parts in common with those of FIG. 1 are indicated by the same reference numerals.

The principle difference between the various embodiments of the present invention and the system illustrated in FIG. 1, lies in the fact that the variable-volume compartment 12 is located at one end of the cylindrical chamber 9, and the piston 11 is disposed in a position which is axially intermediate the variable-volume compartment 12 and one end of the shaft 6 carrying the pinion 5.

This arrangement enables the structure of the system to be simplified considerably and also simplifies the sealing means associated with the piston 11.

FIG. 2 illustrates a first embodiment of the invention, in which the sealing means comprise a sealing ring 22 which is housed in a circumferential groove in the external surface of the piston 11, and which contacts the wall of the cylindrical chamber 9. The resilient means biassing the piston 11 towards the compartment 12 comprise, instead of the helical spring 10 illustrated in FIG. 1, a pair of cup springs 24 interposed axially between the outer ring of the bearing 8 and an annular shoulder 25 formed in the wall of the cylindrical chamber 9. In the embodiment illustrated in FIG. 2, the rod 18 is slidable in a direction perpendicular to the axis of the shaft 6 and is positioned so as to be adjacent the variable-volume compartment 12. In this case also, as in the case of FIG. 1, the piston 11 is shaped such that, whenever there is a loss of fluid from the chamber 12, the piston 11 moves into its end-of-stroke position thus preventing the rod 18 from entering the compartment 12 and causing the power-steering system to come into play unexpectedly.

FIG. 3 illustrates a second embodiment of the system according to the invention, which differs from that of FIG. 2 solely in that the rod 18 is positioned at a distance from the variable-volume compartment 12 and is slidable in a chamber 26 which communicates with the compartment 12 through a duct 27. The possibility of positioning the rod 18 at a distance from the compartment 12 and along any axis permits the system to be designed to meet specific assembly requirements in the best manner possible.

In a manner similar to that illustrated in FIG. 2, the box 2 has a closure plate 28 which defines the opposite end of the compartment 12 from the piston 11 and which is fixed to the body of the box 2 by means of screws 29.

FIG. 4 illustrates a third embodiment of the invention which differs from that illustrated in FIG. 1 in that, in place of the sealing ring 22, the sealing means associated with the piston 11 comprise a deformable diaphragm 30 clamped around its periphery between the body of the box 2 and the closure plate 28, with its central part fixed to the piston 11. In this case, moreover, the rod 18 is slidable adjacent the compartment 12, along an axis parallel to, or coincident with, the axis of the shaft 6. Finally, in place of the sealing ring 31 illustrated in FIGS. 2, 3, the sealing means associated with the rod 18 comprise a deformable diaphragm 32, also clamped around its periphery between the body of the box 2 and the plate 28, with its central part connected to the end surface of the rod 18, which faces the compartment 12.

In the embodiment of FIG. 4, the guarantee against accidental operation of the power-steering in the event of loss of fluid from the compartment 12, derives from the fact that, whenever such conditions arise, the piston 11 is thrust by the spring 24 against the plate 28 and prevents the entry of the rod 18.

The embodiment illustrated in FIG. 4, in which the sealing means associated with the piston and with the rod comprise two deformable diaphragms, offers an important advantage with regard to the assembly of the system in a production line. In fact, prior to the assembly of the box of the system, the two diaphragms may be welded together, or glued, around their annular peripheries which are to be clamped between the box 2 and the plate 28. The welding or glueing of the two peripheries is effected along the entire circumferential lengths of these rings with the exception of a zone having a width, in a circumferential direction, of a few millimeters. A channel is therefore formed in this zone through which the compartment formed between the two diaphragms can communicate with the exterior. A tube is inserted in this channel for the immission of the incompressible fluid (oil or grease) for filling this compartment. After the filling, the channel is closed by local welding or adhesive and the combination of the two diaphragms and the fluid contained therein is mounted in one piece within the box 2 in the assembly line. During operation of the system, sealing is ensured by the clamping of the plate 28 against the box 2 in addition to the welding or glueing of the two diaphragms.

Figure 5:
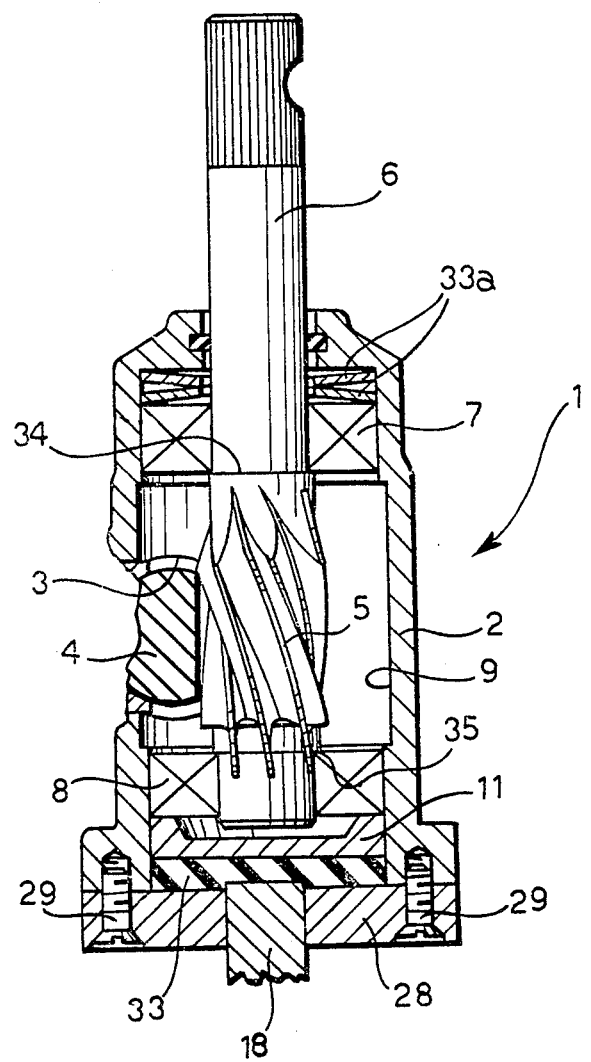
FIG. 5 illustrates a fourth embodiment of the system according to the invention, in which the variable-volume compartment is filled with a rubber element and in which there is a different arrangement of the resilient means which act upon the piston.

FIG. 5 illustrates a further embodiment of the system according to the invention, in which the variable-volume compartment 12 is filled with a rubber element 33 in the form of a disc. The embodiment illustrated in FIG. 5 is further characterised by a different arrangement of the resilient means which urge the piston 11 towards the compartment 12, as will be explained in detail below.

The use of a rubber element for transmitting the control pressure to the rod 18 is known from the prior Italian Patent Application No. 68449-A/81 of the 9th November 1981, and from the corresponding European Patent Application No. 82104765.1 (publication No. 0078879). Already in this known solution use is made of the fact that a rubber element, having its external surfaces enclosed between rigid walls behaves in the same manner as a substantially-incompressible fluid and can transmit pressure generated at any point uniformly in every direction. The solution described in the said Italian Patent Application is equivalent to that illustrated in FIG. 1, except that the variable-volume compartment 12 is filled with a rubber ring instead of a fluid, and the rod 18 presses against a zone of the external lateral surface of the rubber ring. The pressure variations resulting from axial thrusts on the pinion due to torques applied thereto are transmitted by the rubber ring to the rod 18 and thereby to the movable member of the valve. In the prior art solution, however, the movement of the rod 18 is achieved as a result of circumferential creep of the rubber ring towards the zone in which the rod is located. Given the annular shape of the rubber element and the significant distance of the rod from the zone of the rubber ring which is diametrally opposite the rod, the circumferential creep of the rubber is difficult and requires considerable forces on the piston.

In the embodiment illustrated in FIG. 5, the rod 18 is at the centre of the rubber disc 33, and the distance of those parts of the rubber element furthest from the rod is limited. The creep of the rubber resulting from a movement of the piston is predominantly radial and therefore occurs much more easily and with much smaller loads on the piston. The system is thus able to operate correctly and, compared with the solutions of FIGS. 2, 3 and 4 which relate to cases in which the compartment 12 is filled with fluid, has the highly important advantage of not requiring seals either on the piston 11 or on the rod 18.

As mentioned above, FIG. 5 illustrates, purely by way of example, a different arrangement of the resilient means which bias the piston 11 towards the variable-volume compartment 12. This different arrangement can also be adopted in the solutions illustrated in FIGS. 2 to 4. With reference to FIG. 5, the bearing 7 is also, like the bearing 8, a ball bearing and the resilient means which urge the piston 11 towards the variable-volume compartment 12 comprise a pair of cup springs 33a interposed between the outer ring of the bearing 7 and an end wall 34 of the cylindrical chamber 9, situated at the opposite end from the compartment 12. The inner ring of the bearing 7 counteracts an annular shoulder 34 formed on the shaft 6 and is thus able to transmit thrust exerted by the spring 33a to the piston 11 through the shaft 6 and the bearing 8 (the inner ring of the latter, as in the illustrations of the FIGS. 2 to 4, contacts an annular shoulder 35 formed on the shaft 6).

The arrangement of the springs illustrated in FIG. 5 is evidently applicable to all the other embodiments illustrated in FIGS. 2, 3 and 4, and may be useful in any one of these cases to solve problems of bulk and installation in a motor vehicle. It is also clear that the cup springs, shown by way of example in all the FIGS. 2 to 5, may be replaced by helical springs or springs of any other equivalent type.

Naturally, whilst the principle of the invention remains the same, the details of construction and the embodiments may be varied widely in comparison with what is described and illustrated herein purely by way of example, without thereby departing from the scope of the present invention.

I claim:

1. A rack power-steering system comprising:
    a box,
    a helical pinion meshing with a rack,
    a shaft carrying the pinion,
    a bearing which rotatably supports the shaft within a cylindrical chamber in the box, the bearing being slidable within the cylindrical chamber so as to permit axial movement of the pinion,
    a control valve having a movable member which is slidable in an auxiliary chamber in the box,
    means for converting an axial movement of the pinion into a movement of the movable member of the control valve, these means comprising:
    a piston movable axially with the said bearing within the cylindrical chamber in the box,
    a variable-volume compartment defined within the cylindrical chamber by the piston, the compartment being filled with a substantially-incompressible deformable material,
    a rod operatively connected to the movable member of the control valve and having one end face located so as to detect the pressure existing in the variable-volume compartment,
    resilient means biasing the piston and the rod towards the variable-volume compartment,
    wherein the variable-volume compartment is located at one end of the cylindrical chamber, and the piston is located in a position axially-intermediate the variable-volume compartment and one end of the shaft carrying the pinion.

2. A system according to claim 1, in which the substantially-incompressible, deformable material is a fluid, wherein the piston has associated sealing means consisting of a deformable diaphragm fixed around the periphery of the diaphragm to the wall of the cylindrical chamber with a central part pressed against the piston by the fluid in the variable-volume compartment.

3. A system according to claim 1, wherein the rod has an end surface facing the variable-volume compartment.

4. A system according to claim 1, in which the substantially-incompressible, deformable material is a fluid, wherein the rod is located at a distance from the variable-volume compartment and wherein a duct is provided for communicating the variable-volume compartment with the chamber in which the rod is slidable.

5. A system according to claim 1, in which the substantially-incompressible, deformable material is a fluid, wherein the rod is slidable in a direction perpendicular to the axis of the shaft carrying the pinion and wherein the piston is formed and arranged in such a way that, in the event of a loss of fluid from the variable-volume compartment with the consequent movement of the piston to its end-of-stroke position toward the variable-volume compartment, the outer cylindrical surface of the piston contacts the rod and prevents the latter from entering the variable-volume compartment and causing the undesired operation of the power-steering system.

6. A system according to claim 1, in which the substantially-incompressible, deformable material is fluid, wherein the rod is slidable in a direction parallel to the axis of the shaft carrying the pinion, the piston being so formed and arranged that, in the event of loss of fluid from the variable-volume compartment with the consequent movement of the piston into its end-of-stroke position in the direction of the variable-volume compartment, the front surface of the piston facing the variable-volume compartment prevents the rod from entering this compartment and causing the undesired operation of the power-steering system.

7. A system according to claim 1, in which the substantially-incompressible, deformable material is a fluid, wherein the rod has associated sealing means consisting of a deformable diaphragm fixed around the periphery of the diaphragm to the wall of the cylindrical chamber with a central part pressed against the rod by the fluid in the variable-volume compartment.

8. A system according to claim 1, in which the substantially-incompressible, deformable material is a fluid, wherein the piston and the rod have associated sealing means consisting of two diaphragms fixed around their peripheries to the wall of the cylindrical chamber with their central parts pressed against the piston and the rod respectively by the fluid in the variable-volume compartment, and wherein the two diaphragms are attached to each other by welding or glueing around a peripheral ring of contact so that the cavity formed between them can be filled with the said fluid before the combination of the two diaphragms is assembled in the variable-volume compartment.

9. A system according to claim 1, wherein the variable-volume compartment is filled with a rubber element, and wherein the rod is arranged with its axis parallel to, and substantially coincident with, that of the pinion, the rubber element being of such a shape as to fill the variable-volume compartment completely in contact with the lateral wall of the cylindrical chamber and the end wall which faces the variable-volume compartment and also the facing surfaces of the piston and of the rod.

10. A system according to claim 1, wherein the aforesaid resilient means biassing the piston towards the variable-volume compartment are interposed between a further bearing which rotatably supports the shaft adjacent the end opposite to the variable-volume compartment, and an abutment surface formed in the cylindrical chamber.

* * * * *